United States Patent [19]

Lopes et al.

[11] Patent Number: 5,612,929
[45] Date of Patent: Mar. 18, 1997

[54] SPECTRAL PROCESSOR AND RANGE DISPLAY UNIT

[75] Inventors: Joseph L. Lopes, Lynn Haven; Iris C. Paustian, Panama City, both of Fla.

[73] Assignee: The United States of America as represented by the Secretary of the Navy, Washington, D.C.

[21] Appl. No.: 587,800

[22] Filed: Dec. 27, 1995

[51] Int. Cl.$^6$ .................................................. G01S 15/00
[52] U.S. Cl. .......................................... 367/107; 367/116
[58] Field of Search .................................... 367/102, 110, 367/113, 116, 107, 108, 111; 348/162

[56] References Cited

U.S. PATENT DOCUMENTS

| | | | |
|---|---|---|---|
| 2,977,568 | 3/1961 | Roshon, Jr. et al. | 367/102 |
| 3,140,461 | 7/1964 | McKinney | 367/102 |
| 3,939,463 | 2/1976 | Kelly et al. | 367/102 |

*Primary Examiner*—Daniel T. Pihulic
*Attorney, Agent, or Firm*—Harvey A. Gilbert

[57] ABSTRACT

An apparatus for converting the difference frequency between the transmit pulse of a sonar and the return or receive signal from a target to a video representation complementing the audio output of the sonar representing the difference frequency. The audio and complementing video signal indicate the presence of the target and its range. The invention converts the audio signal to a frequency spectrogram by means of digital signal processing including a FFT algorithm. The amplitudes of the frequency components of the audio signal are plotted on the video display of the invention. They are color-coded to indicate the amplitude of the audio signal. The frequency of the audio signal is related to the range of an object detected by the sonar. The invention is mobile and easily managed by a diver.

17 Claims, 6 Drawing Sheets

1

SPECTRAL PROCESSOR AND RANGE DISPLAY UNIT

INTRODUCTION

The present invention relates to the detection and location of underwater objects. In particular, the present invention relates to the detection of underwater objects using sonar, specifically a sonar system element providing a visual output signifying range of the object.

BACKGROUND OF THE INVENTION

Sonars are used to provide aural range information regarding target detection, range, and bearing to a human operator. They are used in both military and non-military applications. A diver-portable sonar that is commercially available is the aural output DHS-200 produced by Datasonics, Inc. since 1993, and produced by General Dynamics for the U.S. Navy prior to 1993. The three sonars used with the invention described herein were: a hand-built model built from spare parts, a General Dynamics sonar from the Federal Supply System, and a commercially available Datasonics DHS-200 sonar with one of its boards replaced with an older, identical board from a General Dynamics sonar because the original board was giving erroneous results. All further references to a sonar will be identified as the DHS-200 sonar, though in reality, all three sonars were used. The DHS-200 sonar produces a Continuous Transmission Frequency Modulated (CTFM) pulse that transmits a frequency sweep from approximately 145 kHz down to 115 kHz. Detection is accomplished aurally by the diver listening during each sweep for a difference frequency (or tone) between the transmitted pulse and a backscattered return from a target. The frequency of the tone determines the range a target is from the sonar. A low frequency tone indicates a target is close while a higher frequency tone corresponds to a target at a further range.

In an evaluation test of detection capability against bottom targets, detection performance was found to be highly dependent upon diver training and experience with a variable average probability of detection. However, a series of controlled measurements demonstrated that the DHS-200 sonar possessed the required sonar parameters (frequency, beam pattern, pulse type, etc.) needed to effectively detect and locate underwater targets. In these controlled measurements, the DHS-200 sonar's aural data were analyzed by viewing a video representation of the sonar's audio output with a spectral display. These measurements suggested that the poor results obtained in the evaluation test were not due to the acoustic performance of the DHS-200, but rather the method of relaying the acoustic information from the sonar to the diver. In other words, divers cannot solely rely on their hearing to detect and locate underwater targets. Consequently, the present invention modifies an existing hand-held sonar by complementing the current aural detection technique with a visual spectral display.

SUMMARY OF THE INVENTION

It is, therefore, an object of the present invention to improve sonar usability and probability of detection, and reduce the effect of operator variabilities in interpreting sonar outputs.

It is thus an object of the present invention to provide a means of supplementing the aural output from a sonar with a visual presentation indicating detection and range of target.

It is yet another object of the present invention to convert a portion of a sonar aural output to a visual presentation indicating detection and range of target.

It is still another object of the present invention to provide a visual output of a sonar to enhance its aural output by converting a portion of the aural output to a color-coded spectrogram display representing detection and range of a target.

These and other objects, benefits, and advantages of the present invention will be more clearly appreciated when the detailed description is considered in conjunction with the accompanying drawings.

DETAILED DESCRIPTION OF THE INVENTION

Figure 2:
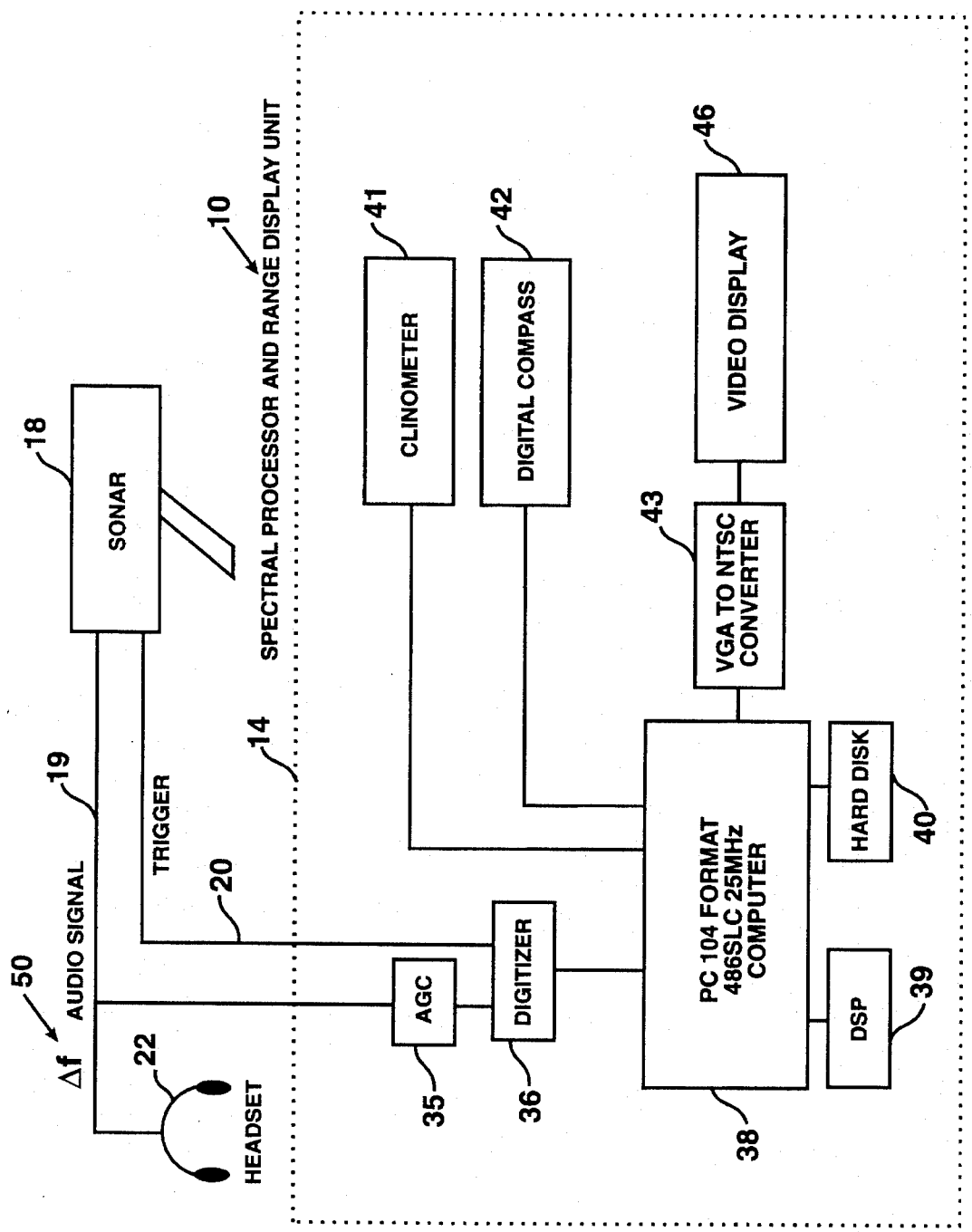
FIG. 2 is a block diagram of the benchtop set up of the present invention.
Figure 3:
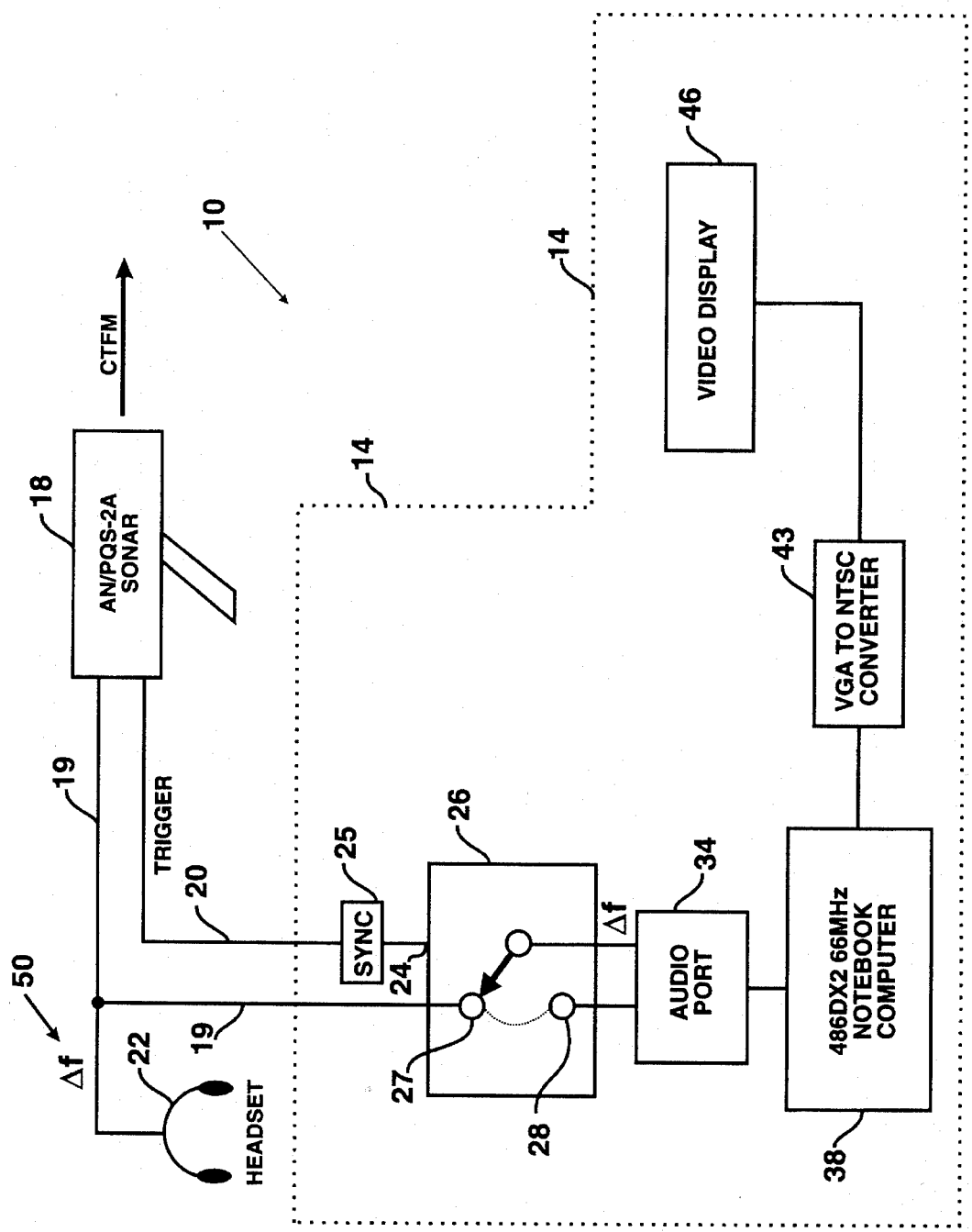
FIG. 3 is a functional block diagram of one embodiment of the present invention.
Figure 5:
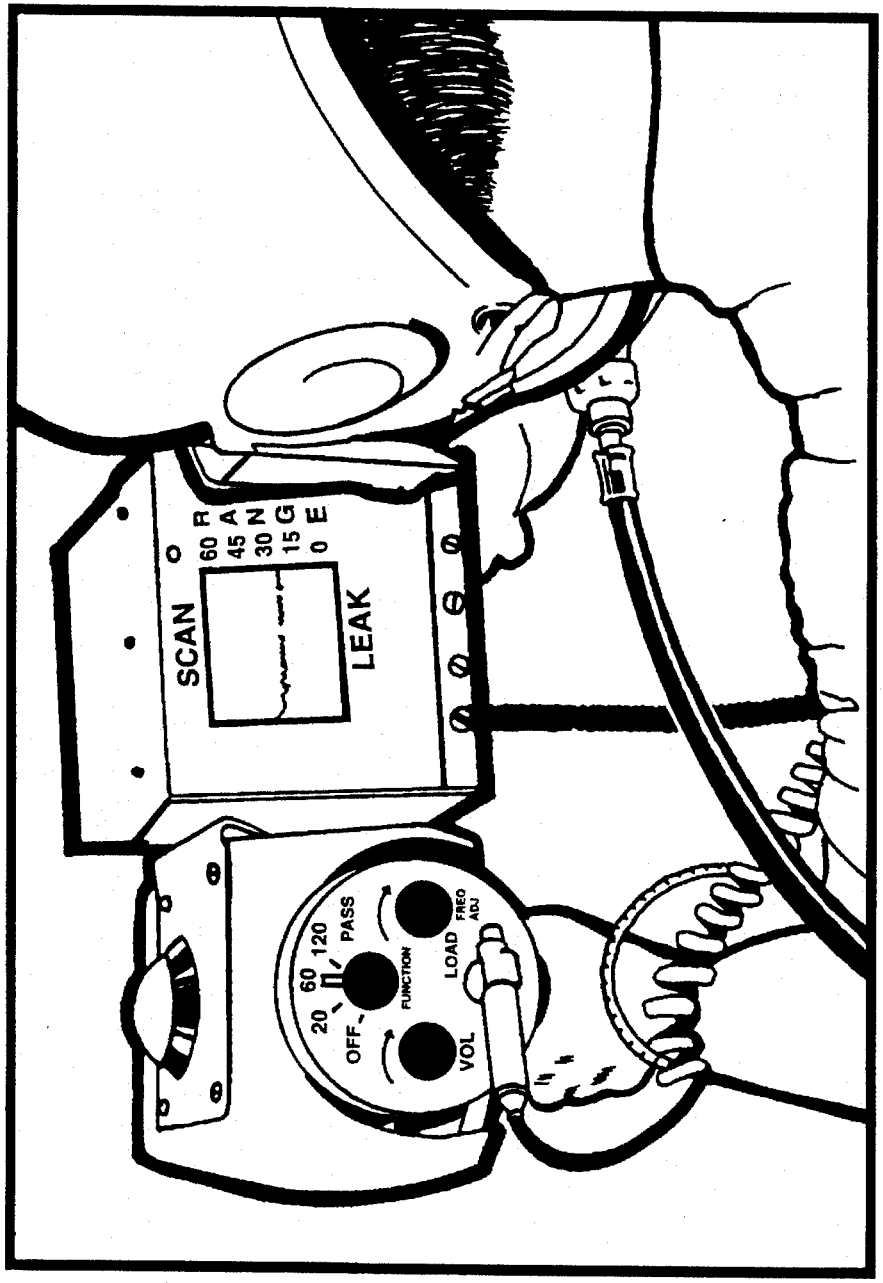
FIG. 5 is a pictorial view of the present invention in use.

Hardware. With reference to FIGS. 2, 3 and 5, the present invention, the Spectral Processing and Range Display Unit 10 is packaged as a piece of equipment that can be added onto an existing sonar such as, for example the DHS-200 sonar and be used to provide a sonar operator with a visual spectral display to complement the oral output of the sonar provided to the operator via earphones.

DHS-200 Background Operation. The DHS-200 sonar used in developing one embodiment of the present invention transmits a CTFM pulse with a frequency sweep from approximately 145 down to 115 kHz. The pulse length of the CTFM signal is either about 0.30, 0.87, or 1.7 seconds corresponding to either the 20 yd, 60 yd, or 120 yd range scale setting of the sonar, respectively. This sonar relies on the fact that the backscattered return (receive signal) from a target is coherent, which implies that a target echo return mimics the transmit pulse in frequency over the pulse length. The sonar then processes acquired data by multiplying the transmit pulse with the receive signal, thereby producing a signal with a difference frequency component. This difference frequency component is perceived by a sonar operator through headphones as an audible tone.

Figure 1:
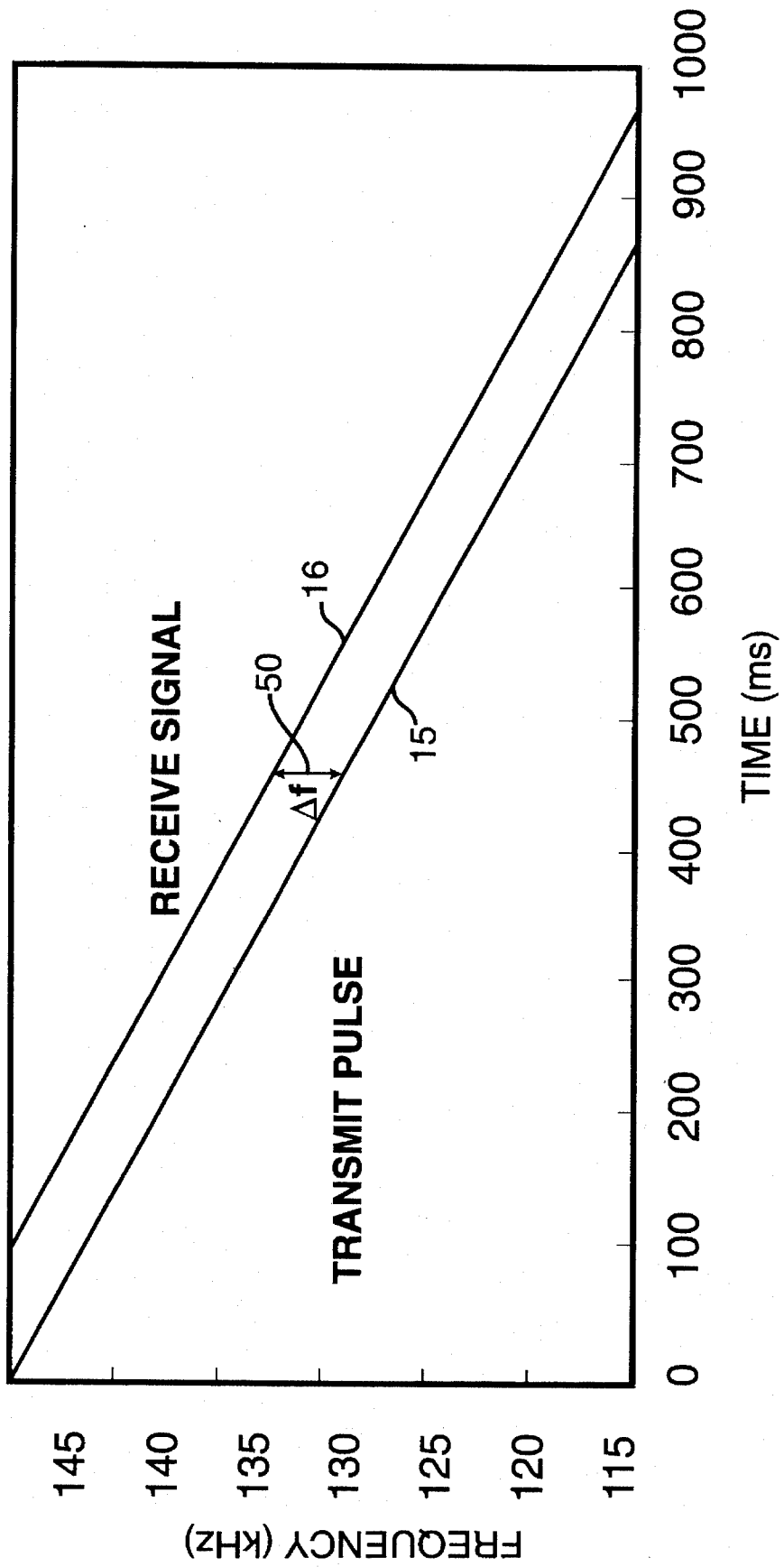
FIG. 1 illustrates the difference frequency by between the transmit pulse and receive signal of a sonar.

A diver using the sonar may estimate the range of a backscattered return by noting the frequency component of the tone. This point can be understood using the illustration in FIG. 1. This figure depicts frequency versus time for transmit pulse 15 and receive signal 16. Note that the receive signal 16 mimics the transmit pulse 15. A return from a target will begin at a particular time during the transmit pulse, which will correspond to a particular difference frequency signal 50 or tone produced by the multiplication of the two signals. If the target was at a different range as a result of moving relative to the sonar 18, then the start of the receive signal will arrive at the sonar at a different time during the transmit pulse, which in turn will change the difference frequency component. Thus, by listening to the frequency of a tone, an operator using a sonar like the DHS-200 may estimate the range of a target at various times.

The audio output of the DHS-200 sonar ranges in frequency from 0 to 2.5 kHz. The latter frequency corresponds to a detection occurring at the full range scale setting (either 20 yd, 60 yd, or 120 yd) of the sonar. Thus, for each of the range scale settings of the sonar, the range of a detected target can be determined from the tonal frequency by $r=0.008f$ (20-yd range scale)

$r=0.024f$ (60-yd range scale)

$r=0.048f$ (120-yd range scale)

Here r is the range of a detected target in yards and f is the frequency of the tone in hertz. These audio tones are presented to the modified DHS-200 sonar for processing by the present invention, the Spectral Processing and Range Display Unit 10.

With reference to FIG. 2, the Spectral Processor and Range Display Unit 10 consists of electronic components that are packaged in a small leak-tight housing 14 that may be fastened to the sonar 18 being used, here the DHS-200 sonar or to the diver's air tanks. These electronic components are used to digitize, process, and display a video representation of the sonar's audio signals. A block diagram of these electrical components integrated with an a DHS-200 sonar 18 is illustrated in FIG. 2.

The sonar 18 is, as shown in FIG. 5, a hand-held model. Referring to FIG. 2, the audio signal output 50 of the sonar 18 is connected to the headset 22 and to an automatic gain control (AGC) circuit 35, an analog to digital (A/D) converter (digitizer) 36, and then the computer 38 via the audio line 19. The trigger signal output from the sonar 18 is connected to the A/D converter (digitizer) 36 and then the computer 38 via the trigger line 20. The AGC circuit 35 amplifies low amplitude audio signals from the sonar to levels upon which the digitizer can operate. The AGC circuit 35 also reduces very high amplitude signals produced by the sonar 18 to prevent overload of the digitizer 36. The output of the digitizer 36 connects to the computer 38. The computer 38 output video is connected to the video graphics array (VGA) to National Television Standards Committee (NTSC) converter 43 which in turn is connected to provide its NTSC video output to the video display 46. The computer 38 also has outputs to a Digital Signal Processing (DSP) board 39 for quicker computations and to a hard disk 40 used for data retrieval and storage. Additional inputs to the computer 38, but not necessary for this invention to work, are the use of a clinometer 41 and a digital compass 42 to provide sonar users with information, respectively, on the tilt of the sonar in relation to the horizontal and the geographical direction in which it is pointing.

In the embodiment shown in FIG. 3, the sonar 18 provides the signal 50, an audio tone representing the frequency difference $\Delta f$ between the transmit pulse and the receive signal, to the headset 22 and contact 27 of solid state switch 26 over the audio line 19. Inherent in the sonar's design, a trigger signal is emitted, synchronized with the beginning of the CTFM pulse. The trigger signal from the sonar is cabled via trigger line 20 to the sync pulse circuit 25 which produces a 5 msec long pulse that is also synchronized with the beginning of the CTFM pulse. The 5 msec pulse activates the solid state switch 26 in this manner: The output of the sync pulse circuit 25 is fed via the sync line 24 to sync the solid state switch 26 operation with the beginning of the CTFM pulse causing the $\Delta f$ signal 50 at contact 27 to be disconnected from the MicroKey™ AudioPort 34 and, during this 5 msec time, causing the half clock rate signal at contact 28 of the switch 26 to be returned to the AudioPort via contact 28. The purpose of the solid state switch 26 is to give the processing software start times and end times for processing the $\Delta f$ audio signal 50, since in this embodiment the trigger signal from the sonar could not be fed directly to the computer.

Referring again to FIG. 3, when the switch 26 is off (contact 27), the audio output signals from the DHS-200 sonar 18 are digitized with the MicroKey™ AudioPort 34 after preprocessing by an AGC device 35 contained therein. When the solid state switch 26 is on (contact 28), the AudioPort 34 digitizes the output voltage of its own half-clock rate signal. The latter signal is a unique pulse and is used by the processing algorithm in the computer 38 to determine the beginning of the CTFM pulse. By knowing the time lapse between this unique pulse and the next unique pulse, the range scale setting of the sonar can be deduced. At the end of 5 msec, the solid state switch changes to the off position, allowing the audio signal 50 through. The AGC circuit 35 depicted in FIG. 2 in the AudioPort 34 (FIG. 3) adjusts the amplitude of the audio signal $\Delta f$ and the 12 bit A/D digitizer 36 (FIG. 2) digitizes it. The MicroKey™ AudioPort 34 is attached to the parallel port of an off-the-shelf 486DX2 66 MHz notebook computer 38 which has 4 MBytes of Randon Access Memory (RAM) and a 128k external cache. Obviously the computer 38 can be implemented with any number of equivalents including more sophisticated programmable digital processors. This digitized output of the AudioPort 34 enters the computer 38 where it is processed into spectral components using a spectrogram computer program. The spectral components are then mapped by computer 38 into a video image which is fed to the converter 43 that changes the VGA output signal of the computer 38 into an NTSC signal. The NTSC signal is output from the converter 43 to the video display 46 which provides an image corresponding to and supplementing each aural tone communicated to the headset 22 by the sonar 18. The NTSC signal is then displayed to a sonar operator via the video display 46, a 0.10-m diagonal Sony model XVM-40 color liquid crystal display (LCD). The color LCD is packaged in a small leak-tight canister fastened to one side of the sonar 18, while all of the other electronics mentioned in this embodiment are contained in a leak-tight housing 14 (approximately 6.5" high, 13" wide, 14" long) that is attached to the diver's air-tanks.

Figure 4A:
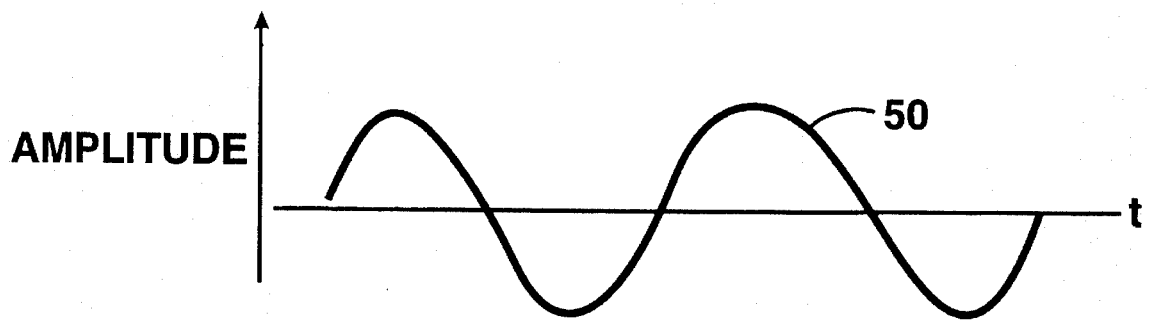
FIG. 4A is a graph of an exemplary audio return signal.
Figure 4B:
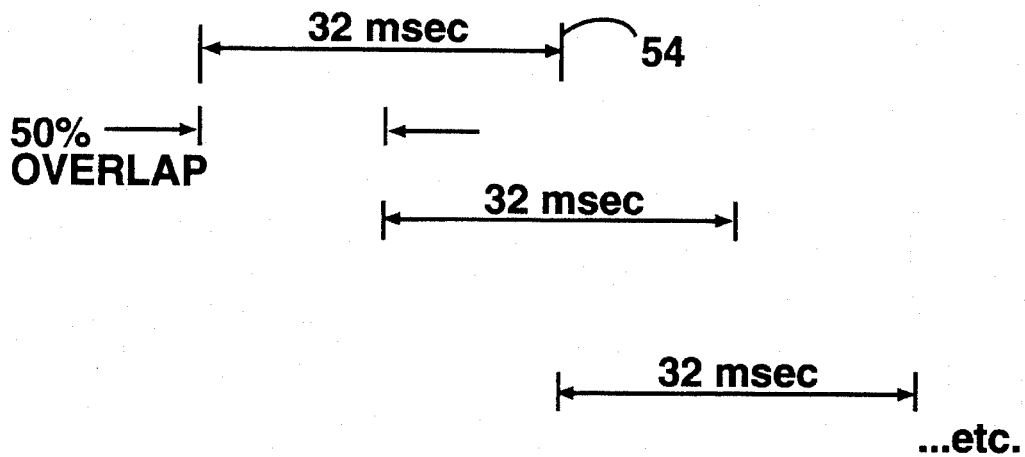
FIG. 4B is a graphical presentation of overlapping sampled data segments.
Figure 4C:
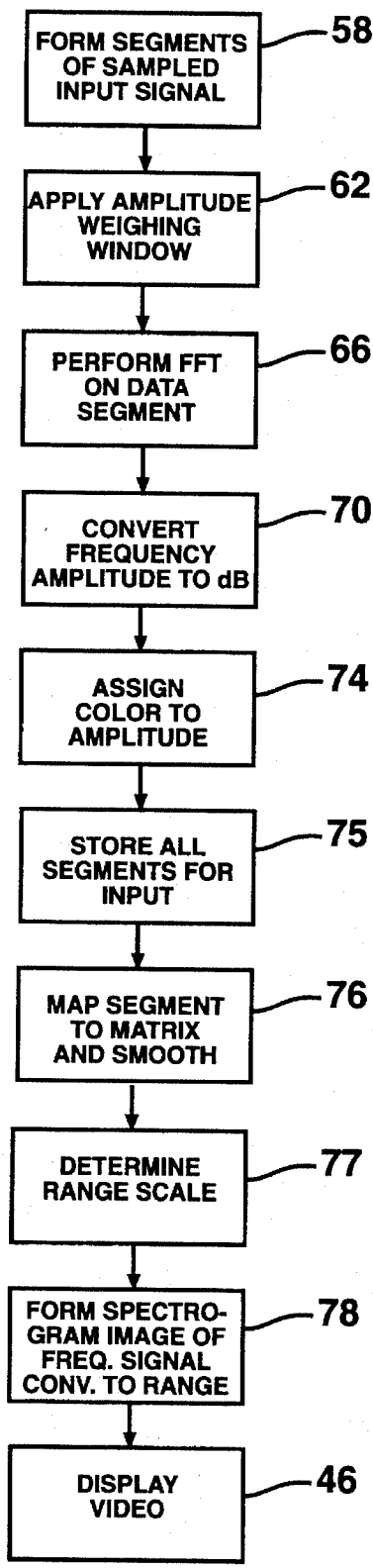
FIG. 4C is a flowchart of the subroutines used in the processing program of the present invention.

Processing Algorithm. The processing algorithm of the invention appears in Appendix 1. The algorithm uses a spectrogram technique to process the sonar 18 audio $\Delta f$ signals. FIG. 4A depicts a time/amplitude waveform exemplary of the $\Delta f$ output of a sonar 18. The overlapping of segments 54 of sampled signal 50 are shown in FIG. 4B and discussed further below. The spectrogram produced by the present invention is an amplitude contour plot of frequency (ordinate-axis) versus time (abscissa-axis) derived from the $\Delta f$ time waveform signal 50. The time waveform signal 50 is related to the audio signal emitted by the sonar 18 and specifically corresponds to one transmitted pulse length of the sonar. A flowchart of the sub-routines used in the processing program is shown in FIG. 4C. In FIG. 4A the audible time waveform signal 50 corresponds to the difference frequency $\Delta f$ between the transmit pulse and the receive signal of one sonar pulse. The signal 50 is sampled, i.e. digitized with an A/D converter 36, at a predetermined rate which results in a known number of data points. The signal 50 is broken down into equal sized time segments 54 for processing. The number of segments 54 chosen is a tradeoff among the time required to run the algorithm (short segments result in more processing time because there are more of them to process), the time required to perform the Fast Fourier Transform (FFT) for transforming the time domain data to the frequency domain (long segments require more time for the FFT to work), and the amount of data recovery (long segments result in better frequency resolution). The signal 50 is processed by the computer 38 using the following steps: A segment 54 is formed 58, it is amplitude weighted using an amplitude weighing window 62, a Fast Fourier Transform (FFT) is performed 66, amplitude in the frequency domain is converted to decibels (dB) 70 using relative output voltage levels, and this amplitude is assigned a color using empirically derived equations 74. The data representing this segment is stored in memory in the computer 38 after this series of steps. Each successive segment 54 is overlapped as much as 50% with the preceding segment as they are formed and processed by the program. When all of the time segments have completed this series of processing steps, they are mapped into a matrix, representing the video display and smoothed 76. Each time segment at this point in the processing of the signal 50 is actually a band of frequency data points, all for the same time (the center time of the original time segment). The matrix 76 plots frequency (ordinate-axis) versus time (abscissa-axis) for each time segment with amplitude of each frequency data point represented by a color. Also at 76, a smoothing routine is performed on each data point and its nearest neighbors in order to make the display easier for the human eye to comprehend. The appropriate range scale setting of the sonar is next determined at 77. The frequencies are formed into a spectrogram and are then converted to ranges and displayed on the video display 46.

In one embodiment of this processing algorithm, the signal 50 is sampled in its entirety at an 8 kHz rate. Other digitizing rates could be used. The equal sized segments used in processing the signal are chosen to be 32 msec in length as depicted in FIG. 4B and contain 256 data points each. Each segment 54 is overlapped 50% with the preceding segment as it is formed. The segments 54 are overlapped successively in order to retain some of the data that would otherwise be lost from using a Hanning window. The Hanning window has a cosine shape rather than rectangular, so data is lost at both edges of the window. The 50% overlap was selected because it is a tradeoff between processing time (more overlap produces more segments to process) and data recovery (less overlap means less data recovery), as discussed above. The 120 yd range signal 50 is about 1700 msec. The 60 yd range signal 50 is about 870 msec, and the 20 yd signal 50 is about 300 msec. Each of the time-interval segments 54 of 256 points is amplitude weighted at 62 using a Hanning window. The Hanning window as well as many other window-type time-domain amplitude weighting methods are standard signal processing techniques used to reduce or adjust side lobe levels for further processing when a signal in time-domain is mapped into the frequency domain. The Hanning window was selected because it is a frequently used window for signal processing which is simple to implement. An FFT is performed next at 66 on each segment yielding 128 data points, instead of 256, as a result of the negative frequency foldover and producing the frequency components for each time segment. The power density spectrum of the data in the windowed segment is obtained by performing an autocorrelation process. The spectral amplitude is calculated in decibels (dB) at 70 for each of the 128 data points in the frequency domain. All that is required is that a relative amplitude is assigned a dB level, but true power levels from the output voltage can be used. The processing algorithm then assigns a color to the spectral amplitude dB levels at 74. The result of the processing of each segment of data is stored in the computer's memory at 75 pending the completion of processing of all the other segments. The program repeats the steps in 58, 62, 66, 70, 74, and 75 for each 50% overlapped time segment 54 until all results for one signal 50 are stored in the computer 38 memory.

Since the invention is using only the audible 2500 Hz of the 4000 Hz represented by the 128 data points produced by the processing algorithm, the program displays only those data points whose frequency is between 0 and 2500 Hz. Thus, only 80 of the 128 data points are stored and used for the display of the spectrogram image at 46. At this point in the processing, each data point can be represented by a time (from its location along the signal 50) and by up to 80 frequencies.

At 76, a matrix is formed by plotting frequency (ordinate-axis) versus time (abscissa-axis) for each processed time segment, with the amplitude of each data point's frequency component represented by a color. A smoothing routine is performed on each data point plus its eight nearest neighbors (a 3 by 3 determinant). The number of points used in the smoothing routine can be different, or even not done at all, but the smoothing helps with visual comprehension of the display image. The difference in time between each trigger signal (unique pulse) is measured, either manually or by the processing algorithm (a preferred embodiment), and is used at 77 to determine the range scale setting of the sonar 18. If the difference in time is about either 0.3, 0.87, or 1.7 seconds it is established at 77 that the sonar 18 is set on either the 20 yd, 60 yd, or 120 yd range scale setting, respectively. In 78 the program forms a spectrogram image in which all of the stored digital data representing the audio signal corresponding to one sonar pulse is converted to range for display at 46 in FIGS. 2 and 3.

The assignment of color to the spectral amplitude dB levels at 74 is explained further as follows. The number of colors available is determined by the hardware used. The hardware will determine which palette color numbers correspond to which colors. Two colors are chosen to display the appropriate range along the ordinate-axis (frequency) that corresponds to difference frequencies (signal 50). The relationship between the amplitude of the difference frequency 50 and palette color number is determined empirically. These empirical relationship equations are determined by processing the aural signals during initial pre-test measurements and optimizing detection results. Since this is hardware determined, the most probable minimum and maximum dB values are divided into the available color palette range. Though it could have been, in this embodiment the division is not linear, since the object is to match more color choices in the range where targets are most expected.

In a preferred embodiment, 256 colors corresponding to the standard VGA palette are used. Here palette color number 0, 1, 254, 255 corresponds to the color black, red, blue, and white, respectively. Palette color numbers between 1 and 254 are associated with the colors in the spectrum from red to blue. The color black and the color white are used to display the appropriate range along the ordinate-axis that corresponds to difference frequencies of 0, 625, 1250, 1875, and 2500 Hz. The relationship between difference frequency and range for a particular range scale setting of the sonar is determined by the equations $$r = 0.008f \text{ (20-yd range scale)}$$

$$r = 0.024f \text{ (60-yd range scale)}$$

$$r = 0.048f \text{ (120-yd range scale)}$$

as discussed and listed previously. The proper range is depicted as a white number on a black background. The other 254 colors are employed in the color assignment of the spectral amplitude dB levels. The maximum spectral amplitude level is assigned red in color, while the lowest displayed level is approximately 30 dB down from the maximum level and corresponds to the color blue. The exact color assigned for each dB level is accomplished by the computer 38 by utilizing either an empirically determined look-up-table or empirically derived equations.

In this preferred embodiment, three empirically derived equations were used. The first equation corresponding with levels between 0 dB-down and 6 dB-down from the maximum amplitude dB-level utilized 190 colors (red to yellow green) is:

$$\text{palette color number} = 255 - 254 \cdot \left( \left( \frac{30 - dB_{level\ maximum\ amplitude}}{30} \right) \cdot 3.72 - 2.72 \right)$$

$$\text{for } 0 \leq dB_{level\ maximum\ amplitude} \leq 6,$$

The second equation associated with levels between 6 dB-down and 29.9 dB-down from the maximum level used 63 colors (green to light-blue) and the equation is:

$$\text{palette color number} = 255 - 254 \cdot \left( \left( \frac{30 - dB_{level\ maximum\ amplitude}}{30} \right) \cdot 0.315 \right)$$

$$\text{for } 6 < dB_{level\ maximum\ amplitude} < 29.9$$

The third equation corresponding to levels greater than 29.9 dB-down from the maximum level employed a deep-blue color and this equation is:

palette color number=254

Once the computer 38 finishes spectrally processing the entire time waveform signal 50, the spectral levels are then displayed to the diver in a spectrogram format via the small color video display 46. As a result, when the DHS-200 sonar detects an object, it will emit a constant frequency audio signal which is heard in the earphones 22 and displayed on the video display 46 as a color line or band that horizontally extends across the screen. If the audio signal is a very high amplitude, the color may be red whereas a lower amplitude signal may be either yellow or green in color. A smoothing routine is performed at 76 on the color-assigned spectrally processed signal prior to displaying the color image to the sonar operator. This smoothing routine enables a more aesthetically pleasing color image to be presented to the sonar operator. The processing algorithm then determines the range scale setting at 77 and uses the appropriate relationship between the difference frequency and range as shown in the equations listed previously to display the appropriate range along the ordinate-axis that corresponds to difference frequencies of 0, 625, 1250, 1875, and 2500 Hz. The computer 38 repeats the above subroutines for each transmitted pulse of the sonar. In another preferred embodiment, the processing algorithm is written in 32-bit computer code generated with Intel CodeBuilder™ C compiler as well as with associated third party Science and Video Graphics Libraries. FIG. 5 depicts a diver operating an a sonar integrated with a Spectral Processor and Range Display Unit.

The structure and method disclosed herein illustrate the principles of the present invention. The invention may be embodied in other specific forms without departing from its spirit or essential characteristics. The embodiment of the invention described herein is to be considered in all respects as exemplary and illustrative rather than restrictive. Therefore, the appended claims rather than the foregoing description define the scope of the invention. All modifications to the embodiment described herein that come within the meaning and range of equivalence of the claims are embraced within the scope of the invention.

APPENDIX 1

NC 77,184

```
/**/
/* This program reads a time waveform signal from binary files */
/* created by the AudioPort with the use of a 12-bit A/D. */
/* The time signal is then mapped to the frequency domain */
/* by performing an FFT on a running window along the data. */
/* At this stage, an autocorrelation is done to obtain */
/* the data's power density spectrum in the windowed segment, */
/* which is displayed after the entire waveform has been sampled. */
/**/ include <stdlib.h>
include <stdio.h>
#include <process.h>
#include <conio.h>
#include <unistd.h>
#include <string.h>
#include <hpgl.h>
#include <graph.h>
#include <sys\types.h>
#include <sys\timeb.h>
#include <math.h>
#include <csl6.h>
#include <bios.h>

/**/
/* Global variables */
/**/ double sfreq,SignalLen,lfreq,hfreq,ratio,msecTime;
    int NewTime,OldTime,Fzero;
    signed short *binary;
    int n,ln,hn,FrqSRng,FrqERng,video_mode,nPnts,nPower;
    int begin,end,loop,period,factor;

double *x,(*wfft)[2];
    double *hanning,(*pds)[2];

struct timeb timebuffer1;
    struct timeb timebuffer2;

char filename[20],Audio[50],suffix[5];

char root[] ="test";

FILE *command_device;

/**/
/* Package function to convert time series to frequency domain using fft. */
/**/

/**/
/* Function to read in desired time waveform signal from a given file. */
/**/
```

```
static void traceget(double *x,int rn,signed short *binary)

{ int i,j,count,flag;
        double temp1,temp2,sign_check;

/**/ flag=0;
        count=0;
        begin=0;
        end=0;
        period=0;

temp1=binary[0]/2048.0;   /* 12-bit A/D */

/* convert binary # to decimal */
/* the binary A/D output is not converted to the true voltage level */
/* The data is resampled to 8kHz with the use of "factor" */
/* Since the AudioPort has a 32kbyte buffer which does not get dumped until full */
/* the time waveform for the 60 yrd range was sampled at 16kHz and that for the */
/* 20yrd range at 32kHz so as to fill up the buffers with the data necessary for the */
/* display of a single time waveform */ for (i=0;i<rn;i++)
        {
          for(j=0;j<factor;j++)
                {
                if(j==0) x[i]=temp1;
                if((i*factor+j+1)<(n*factor))
                 {
                 temp2=binary[i*factor+j+1]/2048.0;
                 sign_check=temp1*temp2;
                 }
                if(sign_check<0)
                 count=count+1;
                else
                 count=0;

/* This section checks for the unique pulse which marks the beginning of a signal, */
/* as well as the signal's duration, which allows the program to determine the range */
/* setting on the sonar. */ if(count>24*factor && flag==0)
                 {
                 flag=1;
                 begin=i;
                 count=0;
                 }
                if(flag==1 && count>24*factor && period==0 && begin>0)
                 {
                 end=i;
                 count=0;
```

```
                period=end-begin;
                if(period<2000 || (8000<period && period<13000) ||
                (3000<period && period<6500))
                   {
                    period=0;
                    if(end<n-2000)
                      begin=end;
                    else
                      begin=0;
                   }
                 }
                 temp1=temp2;
                 }
         }
         return;
}

/**/
/* Autocorrelation routine. */
/**/ static void autocorr(double (*pds)[2])

{
         int i;

/**/ for (i=0;i<nPnts;i++)
         {
                 pds[i][0]=pds[i][0] * pds[i][0] + pds[i][1] * pds[i][1];
                 pds[i][1]=0.0;
         }
         return;
}

/**/
/* Start of main program which calls all other subroutines */
/**/ main()

{ char fullname[20];
         char outname[9],outfull[13],redo[2],c;
         int ping,truegain,ok,i,j,k,l,m,WinPnts,TSegNo,ind;
         double mnmum,mxmum,temp,temp1,d[2];

FILE *rp,*wp,*fopen();

/***/
         /* signal information. */
```

```
/***/
        sfreq=8000.;    /* sampling frequency, data may be obtain at another */
                        /* frequency, but it is resampled upon input into the */
                        /* program so that all data processed is at 8kHz. */ printf("\nfrequency = %e\n",sfreq);
        sprintf(suffix,"%s",".p08");
        factor=1;
        nPnts=256;      /* # of points in time window segment */
        nPower=log10(nPnts)/log10(2);
        printf("\nFFT points = %d\n",nPnts);
```

/* This creates the space in memory for the 256 point running hanning window and corresponding power spectrum */

```
        wfft=(double (*)[2])calloc(nPnts,sizeof(d));
        hanning=(double (*))calloc(nPnts,sizeof(double));
        pds=(double (*)[2])calloc(nPnts,sizeof(d));

/**/
/* The fft is performed on a nPnts (256 point) window for all data */
/* sets, therefore the fft look up table may be gotten now. */
/**/ inifft(wfft,nPnts,1);

/* Windowing is done to obtain time bins to display along the time */
/* axis (abscissa-axis) in the monitor and observe any changes of the*/
/* power spectral density along the time waveform */

/***/
/* The hanning window multiplication factor is also obtained now. */
/***/ for (i=0;i<nPnts;i++)
                hanning[i]=(1-cos(2*PI*i/(nPnts-1)))*0.5;

/**/ truegain=1;

/***/
/* frequency range on the power density spectrum */
/***/ lfreq=0.0;
        hfreq=2500.0; /* Max frequency to display set to 2.5kHz */
        ratio=nPnts/sfreq;
        FrqSRng=ratio * lfreq;  /* index of the low frequency cutoff */
        FrqERng=ratio * hfreq;  /* index of the high frequency cutoff */
        Fzero=ratio * 100.0;

if (FrqSRng<0) FrqSRng=0;
```

```
        if (FrqERng>nPnts/2) FrqERng=nPnts/2;

printf("\nstart freq index = %d : end freq index = %d\n",FrqSRng,FrqERng);

video_mode=19; /* 320x200 pixel resolution, 256 colors, standard vga palette */ v_color=255;
v_rowy=199;
v_colx=319;

plotter_is(video_mode,"CRT");

/* For convenience the standard VGA color spectrum is reversed */
/*Sets palette colors to blue (at the low end) - red (at the high end) spectrum*/
/*This procedure-call inverses the standard 256-color VGA palette red-blue*/
/*spectrum - the standard palette color number for red is 1, but when spectrum_rev*/
/* is in use, 1 (red) is mapped to 254 */
/*For example: the standard red = 1 is now mapped to the number 254  */
/*             the standard blue = 254 is now mapped to the number 1*/ spectrum_rev();

palette_vga(255,60,60,60); /*Sets single palette color for 256-color VGA modes*/

/*Allocates memory to store 8bit 2D image array*/ hpgl_array_8=image(v_rowy+1,v_colx+1);

ping=0;
        SignalLen=3.6;  /* signal pulse length in seconds set to 120yrd sonar setting */
        n=SignalLen*sfreq; /* gives the number of pts collected */

/* binary holds the binary data from the 12-bit A/D in the AudioPort */ binary=(signed short (*))calloc(n,sizeof(signed short));

/***/
        /* Allocate the arrays which will contain the time waveform signal. */
        /***/ x=(double (*))calloc(n,sizeof(double));

/* The commands below control the AudioPort and digitize the data with the use
of the 12-bit A/D and AGC which are built into the AudioPort */
/* Initially, since the sonar setting is unknown, the data is digitized at 8kHz for
3.6 seconds. All waveforms are fully digitized at such a rate, including that from
the 120 yrd setting */ command_device = fopen("microkey","w");
        fputs("init system\r",command_device);
        fflush(command_device);
        fputs("init audio\r",command_device);
        fflush(command_device);
```

```
/* Output from AudioPort goes to a 2MB RAMDisk <d:> created upon boot-up */ sprintf(filename, "d:%s%d", root, ping);

sprintf(Audio,"%s%s%s%s","wait record",filename,suffix," for 3.6\r");
        fputs(Audio,command_device);
        fflush(command_device);
        flushall();

/***/
/* Iteration through the desired pings. */
/***/

OldTime=3;  /* Set to the code for the 120yrd setting */

/* Relative dB scale; since the binary A/D output is not converted to the true voltage level */ mnmum=0.0;    /* Sets the minimum dB value to 0 */
            mxmum=30.0;   /* Sets the maximum dB value to 30 */ temp1=1.0/(mxmum-mnmum);

do
        {
            ftime(&timebuffer1);
            for(i=0;i<v_rowy+1;i++)
             memset(&hpgl_array_8[i][0],0,v_colx+1);

/***/
/* read in the full time waveform signal */
/* from the data file */
/***/ sprintf(fullname,"d:%s%d%s",root,ping,suffix);
            rp=fopen(fullname,"rb");
            fread(binary,sizeof(signed short),n*factor,rp);
            fclose(rp);
            traceget(x,n,binary);
            remove(fullname);

while(period==0 || begin==0)
            {
            sprintf(filename, "d:%s%d", root, ping);
            sprintf(Audio,"%s%s%s","wait record",filename,".p08 for 3.6\r");
            fputs(Audio,command_device);
            fflush(command_device);
            flushall();

if(SignalLen!=3.6)
            {
            free(binary);
            free(x);
            SignalLen=3.6;
            n=SignalLen*sfreq;
```

```
factor=1;

binary=(signed short (*))calloc(n,sizeof(signed short));

x=(double (*))calloc(n,sizeof(double));
} sprintf(fullname,"d:%s%d%s",root,ping,".p08");

rp=fopen(fullname,"rb");
fread(binary,sizeof(signed short),n,rp);
fclose(rp);

traceget(x,n,binary);

remove(fullname);
}

/***/
/* Indexed time. */
/***/
```

/* The running hanning windows have a 50% overlap between successive segments in the time-interval signal; therefore the total # of time bins will be twice the number of points in the original time waveform signal divided by the # of points in the window */

```
        WinPnts=period;
        TSegNo=WinPnts*2.0/nPnts;
```

/* The time axis on the display is divided into 280 pixels; therefore 280 time bins can be displayed */

```
        loop=280.0/TSegNo + 0.5;
        temp=(double)(WinPnts/sfreq);
```

/* Determine the sonar setting and change the sampling rate accordingly to fit the 32kbyte buffer on the AudioPort*/

```
            if (temp<.5)
            {
            NewTime=0;
            sprintf(suffix,"%s",".p32");
            factor=4;
            }
            else
            {
            if (temp<1.)
            {
            NewTime=1;
            sprintf(suffix,"%s",".p16");
            factor=2;
            }
            else
```

```
        {
        NewTime=2;
        sprintf(suffix,"%s",".p08");
        factor=1;
        }
    }
```

/* This section get rid of the pulse that indicates the start of a time waveform sweep */

```
        for(l=0;l<period-24;l++)
            x[l]=x[l+begin];
        for(l=period-24;l<n;l++)
            x[l]=0.0;
```

/* The i-LOOP divides the audio signal into equal time-interval segments*/

```
        for (i=0;i<TSegNo;i++)
        {
            if((i+1)*loop-1<280)
            {
```

/* the time-interval segment is amplitude weighted using a Hanning window*/

```
            for (j=0;j<nPnts;j++)
            {
                pds[j][1]=0.0;
                if ((ind=i*nPnts/2+j)<n)
                    pds[j][0]=x[ind]*hanning[j];
                else
                    pds[j][0]=0.0;
            }
```

/* function performs FFT, thereby mapping time domain data into frequency domain*/
```
            ok=fft(pds,wfft,nPnts,nPower);
            autocorr(pds);
```

/* Calculate the "relative" power spectrum in dB and normalize */
/* i.e. frequency components for each segment are obtained with */
/* the amplitude converted to dB */

```
            for (j=FrqSRng;j<FrqERng;j++)
            {
                if(pds[j][0]>0)
                {
                    if (j>Fzero)
                        temp=(10*log10(pds[j][0]+pds[nPnts-j][0])-mnmum)*temp1;
                    else
                        temp=0.0;
                }
                if (temp>1.0) temp=1.0;
```

/* Assign the amplitude to a color range, depending on the signal level */
/* For convenience the standard VGA color spectrum has been reversed */

```
                        if (temp<0.8)
                            {
/* standard palette color number = 255 - 254 * [((30 - dB level from max amplitude)/30) * 0.315] */
                            temp=0.315*temp;
                            }
                        else
                            {
/* standard palette color number = 255 - 254 * [((30 - dB level from max amplitude)/30) * 3.72 -
2.72] */
                            temp=temp*3.72-2.72;
                            }
/* standard palette color number = 255 - 254 * [(30 - dB level from max amplitude)/30] */
                        if (temp<.004)
                            temp=.004;

/* Since there are more pixel than values to display a small area is filled with color */
                        for (k=0;k<loop;k++)
                            {
hpgl_array_8[199-(int)(j*2.5)][i*loop+k]=(unsigned char)(temp*254);
hpgl_array_8[199-(int)(j*2.5+0.5)][i*loop+k]=(unsigned char)(temp*254);
hpgl_array_8[199-(int)(j*2.5+1.0)][i*loop+k]=(unsigned char)(temp*254);
hpgl_array_8[199-(int)(j*2.5+1.5)][i*loop+k]=(unsigned char)(temp*254);
                            }
/*Smoothing of the color area is done as it is filled*/ if(i>0 && j>0)
                            {
                            for(l=(int)(j*2.5-1.5);l<(int)(j*2.5+1.5);l++)
                             for(k=loop*(i-1)+1;k<loop*(i+1)-1;k++)
                                {
                    temp=hpgl_array_8[199-l-1][k-1]+hpgl_array_8[199-l][k-1]
                        +hpgl_array_8[199-l+1][k-1]+hpgl_array_8[199-l-1][k]
                        +hpgl_array_8[199-l+1][k]+hpgl_array_8[199-l-1][k+1]
                        +hpgl_array_8[199-l][k+1]+hpgl_array_8[199-l+1][k+1]
                        +hpgl_array_8[199-l][k];
                            hpgl_array_8[199-l][k]=(unsigned char)(temp/9.0);
                                }
                            }
                        }
                    else
                      break;
                    } viewport(0.,140.,0.,100.);

plot_image(hpgl_array_8,0,279,0,199);

/* Check if the sonar settings have changed and the lables need to be changed */
```

```
if(OldTime!=NewTime)

{ viewport(140.,165.,0.,100.);
vclear();
window(0,39,0,199);
csize(3.8);
pen(255);
lorg(2);
switch (NewTime)
{
case 0:
 {
 label(0,9,"0");
 label(0,49,"5");
 label(0,99,"10");
 label(0,149,"15");
 label(0,189,"20");
 label(1,8,"0");
 label(1,48,"5");
 label(1,98,"10");
 label(1,148,"15");
 label(1,188,"20");
 label(1,9,"0");
 label(1,49,"5");
 label(1,99,"10");
 label(1,149,"15");
 label(1,189,"20");
 label(2,9,"0");
 label(2,49,"5");
 label(2,99,"10");
 label(2,149,"15");
 label(2,189,"20");
 }
 break;
case 1:
 {
 label(0,9,"0");
 label(0,49,"15");
 label(0,99,"30");
 label(0,149,"45");
 label(0,189,"60");
 label(1,8,"0");
 label(1,48,"15");
 label(1,98,"30");
 label(1,148,"45");
 label(1,188,"60");
 label(1,9,"0");
 label(1,49,"15");
 label(1,99,"30");
 label(1,149,"45");
 label(1,189,"60");
```

```
            label(2,9,"0");
            label(2,49,"15");
            label(2,99,"30");
            label(2,149,"45");
            label(2,189,"60");
            }
            break;
        case 2:
            {
            label(0,9,"0");
            label(0,49,"30");
            label(0,99,"60");
            label(0,149,"90");
            label(0,189,"120");
            label(1,8,"0");
            label(1,48,"30");
            label(1,98,"60");
            label(1,148,"90");
            label(1,188,"120");
            label(1,9,"0");
            label(1,49,"30");
            label(1,99,"60");
            label(1,149,"90");
            label(1,189,"120");
            label(2,9,"0");
            label(2,49,"30");
            label(2,99,"60");
            label(2,149,"90");
            label(2,189,"120");
            }
            break;
        }
    }

OldTime=NewTime;

free(binary);

free(x);

SignalLen=2*period/sfreq+0.3;   /* signal pulse length */ n=SignalLen*sfreq; /* gives the number of pts collected */ binary=(signed short(*))calloc(n*factor,sizeof(signed short));

x=(double (*))calloc(n,sizeof(double));

ping=ping+1;

ftime(&timebuffer2);

sprintf(filename, "d:%s%d", root, ping);
```

```
/*Obtains the next time waveform signal*/ sprintf(Audio,"%s%s%s%s%.2f%s","wait record ",filename,suffix," for ",SignalLen,"\r");

fputs(Audio,command_device);
 fflush(command_device);
 flushall();

msecTime=timebuffer2.time+timebuffer2.millitm/1000.0-timebuffer1.
time-timebuffer1.millitm/1000.0;

} while (!kbhit());

fclose(command_device);
        plotter_off();
printf("\nstart = %d, end = %d, period = %g\n",begin,end,(double)period/sfreq);
        printf("\nEllapsed time in sec = %le\n",msecTime);
}
```

What I now claim as my invention is:

1. An apparatus for converting the audio output of a signal return of a sonar to a visual output indicating detection and range of a sonar target, said sonar also having a trigger signal output, said apparatus comprising:

means for preprocessing said audio output to prepare said output for conversion to a visual output;

means for converting said preprocessed audio output from the time domain to a frequency domain spectrogram;

means for processing said frequency domain spectrogram to a video form; said means for processing said frequency domain spectrogram having a clock rate signal; and means for displaying said video form of said spectrogram.

2. The apparatus of claim 1 wherein said means for preprocessing said audio output comprises:

means for producing a sync signal from said trigger signal;

means for maintaining said audio output of said sonar at a predetermined amplitude level;

means for digitizing said audio output maintained at said predetermined amplitude level; and means for alternately providing said audio output and said half-clock-rate signal to said converting means.

3. The apparatus of claim 1 wherein said means for converting said preprocessed audio output from the time domain to a frequency domain spectrogram comprises:

means for storing said digitized audio output;

means for dividing said digitized audio output into a plurality of equal sized time segments;

means for amplitude weighing each segment of digitized audio output;

means for performing a fast Fourier transform on said segment of amplitude weighed audio output;

means for converting the amplitude of the Fourier transformed time domain audio output to the frequency domain in dB;

means for assigning a color to each of said amplitudes in dB;

means for storing each of the color and amplitude assignments for each segment until all overlapping segments comprising one audio output have assignments; and means for forming a spectrogram from said frequency domain amplitude and corresponding color assignments.

4. The apparatus of claim 3 wherein said segments are successively overlapped.

5. The apparatus of claim 4 wherein said segments are successively overlapped up to fifty percent (50%).

6. The apparatus of claim 5 wherein said means for amplitude weighing each segment of digitized audio output employs a Hanning window.

7. The apparatus of claim 6 herein said means for assigning a color to each of said amplitudes in dB is a lookup table containing preassigned color to amplitude combinations, said table stored in said means for storing.

8. The apparatus of claim 5 herein said means for assigning a color to each of said amplitudes in dB is defined by a color number 0, 1, 254, and 255 corresponding to the color black, red, blue, and white, respectively, and color numbers between 1 and 254 are corresponded with the colors in the spectrum from red to blue, with the colors black and white used to depict white range numbers on a black background, and the exact color assigned to each dB level determined from $$\text{palette color number} = 255 - 254 \cdot \left( \left( \frac{30 - dB_{level\ maximum\ amplitude}}{30} \right) \cdot 3.72 - 2.72 \right)$$

for $0 \leq dB_{level\ maximum\ amplitude} \leq 6$, for dB levels between 0 dB down and 6 dB down from the maximum amplitude dB level and using 190 colors from red to yellow green, and from $$\text{palette color number} = 255 - 254 \cdot \left( \left( \frac{30 - dB_{level\ maximum\ amplitude}}{30} \right) \cdot 0.315 \right)$$

for $6 < dB_{level\ maximum\ amplitude} < 29.9$ for dB levels between 6 dB down and 29.9 dB down from the maximum dB level using 63 colors from green to light blue, and from $$\text{palette color number} = 254$$

for levels greater than 29.9 dB-down from the maximum level employing a deep blue color.

9. The apparatus of claim 5 further comprising the means for smoothing the retained color assigned amplitude data for all segments prior to forming said spectrogram.

10. The apparatus of claim 5 further comprising means for measuring the difference in time between each successive trigger signal to determine the range scale of said sonar.

11. The method, for a sonar having an audio signal output and a trigger output, of converting the audio signal output of a sonar target return corresponding to a transmitted pulse, to a corresponding visual output for display to a sonar operator comprising the steps of:

Step 1—converting said trigger signal to a sync signal for indicating the start of the audio signal return from the transmitted pulse;

Step 2—converting said audio signal to digital data;

Step 3—sampling the digital data to yield successively overlapping time segments of said data for all the data corresponding to each individual audio signal;

Step 4—applying a data window to each overlapping segment of digital data;

Step 5—transforming each segment of window processed data from the time domain to amplitudes in the frequency domain;

Step 6—assigning a different color to each amplitude;

Step 7—retaining the result of Step 6;

Step 8—performing Steps 3 through 7 until all overlapping segments have been processed;

Step 9—correlating each frequency color combination with range;

Step 10—forming a spectrogram image from the digital data for each processed audio signal; and Step 11—displaying the spectrogram.

12. The method of claim 11 further comprising the step of automatically controlling and maintaining the amplitude level of said audio signal of step 1 for further processing.

13. The method of claim 11 further comprising the step of converting the amplitudes of the frequency domain data of step 5 to amplitudes in dB and retaining the results for further processing.

14. The method of claim 11 wherein the transforming of each segment from the time domain to the frequency domain is performed by the application of a fast Fourier transform type of process.

15. The method of claim 11 further comprising the step of smoothing the retained color assigned amplitude data for all segments prior to forming said spectrogram.

16. The method of claim 11 further comprising the step of measuring the difference in time between each successive trigger signal to determine the range scale of said sonar.

17. The method of claim 11 wherein the overlapping of said segments is in an amount up to fifty percent (50%).

* * * * *